April 23, 1940.  M. SCHUERMANS ET AL  2,198,554
LIGHTING SYSTEM FOR USE ON VEHICLES TO FACILITATE PASSING AT NIGHT
Filed April 26, 1937
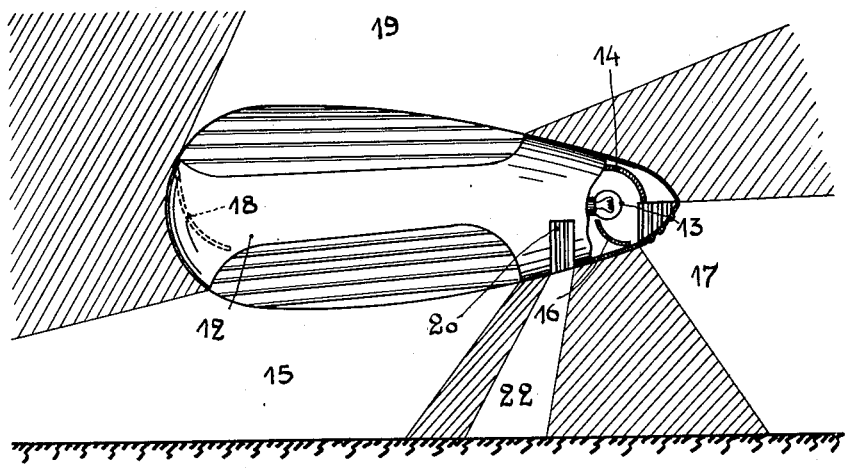
INVENTORS
MAURICE SCHUERMANS
ALBERT BARET
BY
Young, Emery & Thompson
ATTYS.

Patented Apr. 23, 1940

2,198,554

UNITED STATES PATENT OFFICE 2,198,554

LIGHTING SYSTEM FOR USE ON VEHICLES TO FACILITATE PASSING AT NIGHT

Maurice Schuermans and Albert Baret, Brussels, Belgium

Application April 26, 1937, Serial No. 139,084
In Belgium May 2, 1936

1 Claim. (Cl. 240—7.1)

The invention relates to a lighting system for vehicles which is brought temporarily into action in place of the normal lighting system of the vehicle when passing another vehicle so as to allow the vehicles to pass in full safety.

The novelty of the invention consists principally in the fact that the rays of light emitted by a source situated at the front of the vehicle are intercepted towards the front and towards the rear in the direction of vision of the occupants of the vehicles so that the front part of the vehicle and the ground in front of the vehicle are illuminated without, however, causing road users to be dazzled.

By means of the invention, the front part of the vehicle becomes entirely visible and identifiable from a distance by night; the drivers of vehicles who are about to pass the vehicle which is thus illuminated see, before they pass, the outline, the size, the nature and the number plate of the vehicle which they are about to pass.

In the lighting device according to the invention, a source of light is arranged in such a manner as to illuminate the ground on the passing side and towards the rear of the vehicle, so as to make the road visible to the driver who is going to pass before and during the act of passing.

This lighting is such that without dazzling anyone, it lights the front part of the vehicle and also the sides and the edges of the road in front, at the level of the driver and behind him. This allows certain operations which are dangerous with ordinary lighting to be carried out in perfect safety. Such operations are reversing, steering into narrow roads lined with ditches, avoiding an obstacle by using the whole of the available width of the road. New advantages are also obtained such as the reading of sign posts, names and number of streets without difficulty and without getting out of the car, supplying light to those who have to repair a tire by night on the road or to do work on their car and the illumination of the part of the vehicle where the work is carried out, the identification of pedestrians with whom one speaks at night on the road, the determination of the nature of the ground upon which one steps on descending from the vehicle.

Furthermore, the ground underneath and behind the vehicle is illuminated which among other advantages allows the person who is about to pass to see the front wheels of the vehicle which is passing and to realise at once as if in full daylight the manoeuvres which the latter is carrying out.

The lighting is arranged in such a fashion that the road on the passing side of the vehicle and behind the driver and the vehicle is illuminated in such a manner that the part of the road which is to be occupied by the passing driver is rendered visible to him before he enters upon it and remain so during the time he is passing.

During passing, the running of the vehicle thus lighted is obtained by means of a source of light directed towards the front but hidden. This source of light thus completes the device without providing a dazzling light. Light is projected forward to a sufficient depth preferably to the side of the road opposite to that occupied by the passing vehicle.

All these advantages are obtained by indirect lighting and no source of light is visible to the drivers of the passing vehicles. This device radically suppresses dazzle which is so dangerous and which causes so many accidents when vehicles pass one another at night.

Further, it allows vehicles to pass each other in safety without excessively slowing down because the radically suppressing dazzling the danger existing with the usual lighting systems of blinding drivers for a short space is eliminated.

The attached drawing indicates by way of example and without restricting the scope of the invention an embodiment of the invention. The latter embraces the various novel details comprised in the arrangements shown.

The figure is a view partly in section of a device according to the invention, which serves at the same time to light up the vehicle and to provide illumination enabling the vehicle to be properly controlled when passing another.

A single light source 13 is disposed towards the back of the elongated head lamp 12. Part of the rays of this lamp 13 are reflected by the reflector 14, in the form of a beam of light 15 directed towards the ground in front of the vehicle and extending to a depth of at least 30 metres. Certain of the rays from the lamp 13 are reflected by the reflector 16 in the form of a beam 17 directed towards the ground below and behind the vehicle. Finally, the rays which have not been utilised, for the beam 15 are directed by the reflector 18 as a sheet of light 19 which illuminates the whole or a part of the front of the vehicle. Furthermore, an opening 20 in the wall of the head lamp and extending over approximately half the circumference of the latter, provides side lighting 22 of the sides of the road a little in front of the driver of the vehicle. The reflector 18 may without departing from the invention be replaced by a source of light.

It will readily be seen from the above that the vehicle provided with this device can be properly identified and that moreover its driver can pass another vehicle in perfect safety without abnormally reducing his driving speed.

It should be noted that in the above mentioned example the light from the single source 13 is utilised to the maximum so that the object of the invention can be attained without overloading the batteries normally employed on automobiles.

What we claim is:

A lighting device for vehicles adapted to be used for passing at night, comprising a lamp casing with an opaque front wall capable of preventing projection externally of light rays parallel to the ground, a light source within said casing, a pair of reflectors adjacent the light source, said reflectors being located on opposite sides of a horizontal plane passing through the light source, one of said reflectors being arranged to throw a beam of light through said casing downwardly and rearwardly in a direction oblique to the axis of the vehicle, and the other reflector being arranged to throw a light beam on the ground in front of the vehicle, and a third reflector arranged to intercept light rays from one of said pair of reflectors and reflect said rays as a beam impinging on the front face of the vehicle.

MAURICE SCHUERMANS.
ALBERT BARET.